(12) United States Patent
Izumi et al.

(10) Patent No.: US 10,859,182 B2
(45) Date of Patent: Dec. 8, 2020

(54) SHAFT-INTEGRATED GEAR AND DRIVING DEVICE

(71) Applicants: Jeco Co., Ltd., Saitama (JP);
TOYOTA JIDOSHA KABUSHIKI KAISHA, Aichi (JP)

(72) Inventors: Hikoshi Izumi, Saitama (JP); Kazuya Sato, Saitama (JP); Taiki Miyokawa, Saitama (JP); Tomoki Mabuchi, Aichi (JP); Youichiro Ogata, Aichi (JP)

(73) Assignees: Jeco Co., Ltd., Saitama (JP);
TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/229,407

(22) Filed: Aug. 5, 2016

(65) Prior Publication Data
US 2017/0175925 A1   Jun. 22, 2017

(30) Foreign Application Priority Data
Dec. 22, 2015  (JP) .................................. 2015-249563

(51) Int. Cl.
| | | |
|---|---|---|
| F16K 31/53 | (2006.01) | |
| F16H 55/06 | (2006.01) | |
| F02D 9/04 | (2006.01) | |
| F16K 31/04 | (2006.01) | |
| F16H 57/00 | (2012.01) | |
| F16H 1/16 | (2006.01) | |

(52) U.S. Cl.
CPC ................ F16K 31/53 (2013.01); F02D 9/04 (2013.01); F16H 55/06 (2013.01); F16H 57/0025 (2013.01); F16K 31/041 (2013.01); F16K 31/535 (2013.01); F16H 1/16 (2013.01)

(58) Field of Classification Search
CPC ...... F16K 31/53; F16K 31/535; F16K 31/041; F16H 55/06; F16H 57/002; F16H 1/16; F02D 9/04
USPC ................... 29/893.2, 893.1; 251/248, 249.5
See application file for complete search history.

(56) References Cited

U.S. PATENT DOCUMENTS

| | | | | |
|---|---|---|---|---|
| 2,064,723 A | * | 12/1936 | Benge ..................... | F16H 55/06 428/131 |
| 3,200,665 A | * | 8/1965 | Wells ...................... | F16H 55/06 474/161 |
| 3,471,121 A | * | 10/1969 | Geiselman ............... | F16K 1/22 251/308 |
| 5,275,375 A | * | 1/1994 | Semence ............... | F02D 9/1055 123/400 |

(Continued)

FOREIGN PATENT DOCUMENTS

| | | |
|---|---|---|
| CN | 104110330 | 10/2014 |
| JP | 2001-289071 | 10/2001 |

(Continued)

OTHER PUBLICATIONS

Japanese Office Action for 2015-249563 dated Oct. 17, 2017.
Chinese Office Action for 201610659739.2 dated Sep. 5, 2018.

*Primary Examiner* — Umashankar Venkatesan
*Assistant Examiner* — Andrew J Rost
(74) *Attorney, Agent, or Firm* — IPUSA, PLLC (57) ABSTRACT

A shaft-integrated gear includes a rotational shaft formed of a resin material; and a cylindrical gear that is formed of a metal material, wherein the cylindrical gear fits around a gear support part of the rotational shaft.

4 Claims, 10 Drawing Sheets

(56) References Cited

U.S. PATENT DOCUMENTS

| | | | | |
|---|---|---|---|---|
| 6,053,060 | A * | 4/2000 | Tumberlinson | F02N 15/062 |
| | | | | 123/179.26 |
| 6,739,312 | B2 * | 5/2004 | Komeda | F02D 9/106 |
| | | | | 123/337 |
| 6,851,410 | B2 * | 2/2005 | Kawai | F02D 9/1035 |
| | | | | 123/399 |
| 7,850,564 | B2 * | 12/2010 | Nonoshita | B62M 9/105 |
| | | | | 474/152 |
| 2005/0252327 | A1 * | 11/2005 | Shogren | F16D 1/0858 |
| | | | | 74/431 |
| 2008/0035094 | A1 * | 2/2008 | Torii | F02D 9/103 |
| | | | | 123/188.14 |
| 2009/0120713 | A1 * | 5/2009 | Oberle | F16H 55/17 |
| | | | | 180/444 |
| 2009/0282939 | A1 * | 11/2009 | Rogowski | F16H 55/06 |
| | | | | 74/424.5 |
| 2010/0282012 | A1 * | 11/2010 | Beutler | F16H 55/14 |
| | | | | 74/443 |
| 2014/0238171 | A1 * | 8/2014 | Kastrup | F16H 57/0025 |
| | | | | 74/434 |
| 2014/0311464 | A1 | 10/2014 | Sano et al. | |
| 2015/0129348 | A1 * | 5/2015 | Kiyota | B62D 5/0409 |
| | | | | 180/444 |

FOREIGN PATENT DOCUMENTS

| | | |
|---|---|---|
| JP | 2014-211189 | 11/2014 |
| JP | 2014-222107 | 11/2014 |
| JP | 2015-203477 | 11/2015 |

* cited by examiner

SHAFT-INTEGRATED GEAR AND DRIVING DEVICE

FIELD

The following disclosure relates to a shaft-integrated gear and an exhaust valve driving device.

BACKGROUND

In order to enhance exhaust efficiency and quietness of a vehicle, an exhaust valve driving device has been used, which is for switching exhaust passages by opening and closing an exhaust valve installed in a muffler. As for an exhaust valve driving device, a configuration has been known that includes a rotational shaft to be connected to the exhaust valve; a motor for rotating the rotational shaft; and a position sensor for detecting a rotation position of the rotational shaft.

Here, a high temperature (e.g., greater than or equal to 200° C.) exhaust gas flows into an exhaust passage of a vehicle. In this case, a motor and a position sensor may fail due to heat conducted from the exhaust valve through the rotational shaft. In this regard, an exhaust valve driving device has been known such that an exhaust valve, a motor, and a position sensor are configured so that the motor and the position sensor are separated from the exhaust valve, and a heat insulating plate is provided between the exhaust valve and the motor (cf. Patent Document 1 (Japanese Unexamined Patent Publication No. 2001-289071), for example).

SUMMARY

There is a need for a shaft-integrated gear with a small and simple configuration such that driving force can be transmitted from a driving source to a target to be driven, and that a heat insulating property between the target to be driven and the driving source is favorable.

According to an aspect of the present disclosure, there is provided a shaft-integrated gear including a rotational shaft formed of a resin material; and a cylindrical gear that is formed of a metal material, wherein the cylindrical gear fits around a gear support part of the rotational shaft.

According to another aspect of the present disclosure, there is provided an exhaust valve driving device including a shaft-integrated gear including a rotational shaft formed of a resin material, and a cylindrical gear that is formed of a metal material, wherein the cylindrical gear fits around a gear support part of the rotational shaft; a driving source that is to be connected to the cylindrical gear to drive the shaft-integrated gear; a position sensor that detects a rotation position of the shaft-integrated gear; and a connection mechanism that connects the shaft-integrated gear to an exhaust valve, the exhaust valve being installed in an exhaust passage of an internal combustion engine.

DESCRIPTION OF EMBODIMENTS

In the exhaust valve driving device according to the above-described Patent Document 1, a device configuration may be enlarged due to separation between the exhaust valve and the motor. Furthermore, it is required to provide the heat insulating plate between the exhaust valve and the motor, so that a number of components may be increased, and the configuration may be complicated.

Here, a configuration may be considered such that a rotational shaft and a gear are formed of a resin material with a low thermal conductivity, so as to suppress heat conduction from the exhaust valve to the motor. However, if a gear is formed of a resin material, the strength of the gear may be insufficient, and the gear may be damaged by an impact during opening and closing of the exhaust valve. Consequently, the gear may become incapable of transmitting driving force of the motor, and the exhaust valve may become incapable of being opened and closed.

According to an embodiment, there is provided a shaft-integrated gear with a small and simple configuration such that driving force can be transmitted from a driving source to a target to be driven, and that a heat insulating property between the target to be driven and the driving source is favorable.

The embodiment is described below by referring to the accompanying drawings. Note that, in the drawings, the same reference numerals may be assigned to elements with the same configurations, and thereby duplicated description may be omitted.

First, an exhaust valve driving device 100 according to the embodiment is described by referring to the drawings. The exhaust valve driving device 100 is connected, for example, to an exhaust valve installed in a muffler of a vehicle; and the exhaust valve driving device 100 opens and closes the exhaust valve, so that an exhaust passage of an exhaust gas emitted from an internal combustion engine can be switched.

Figure 1A:
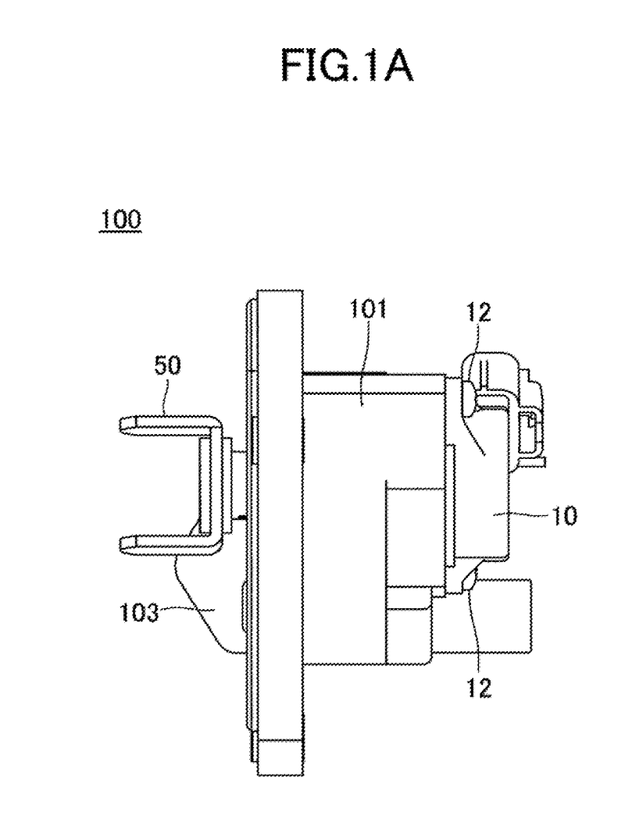
FIGS. 1A and 1B are diagrams illustrating an example of an exhaust valve driving device according to an embodiment.
Figure 1B:
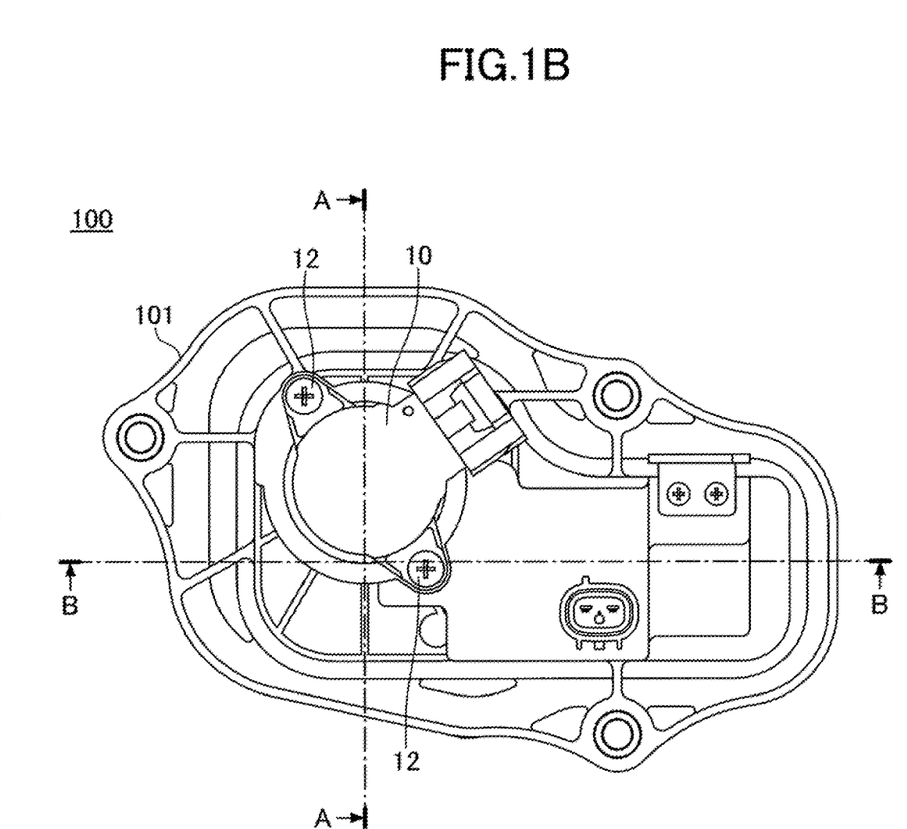
Figure 2:
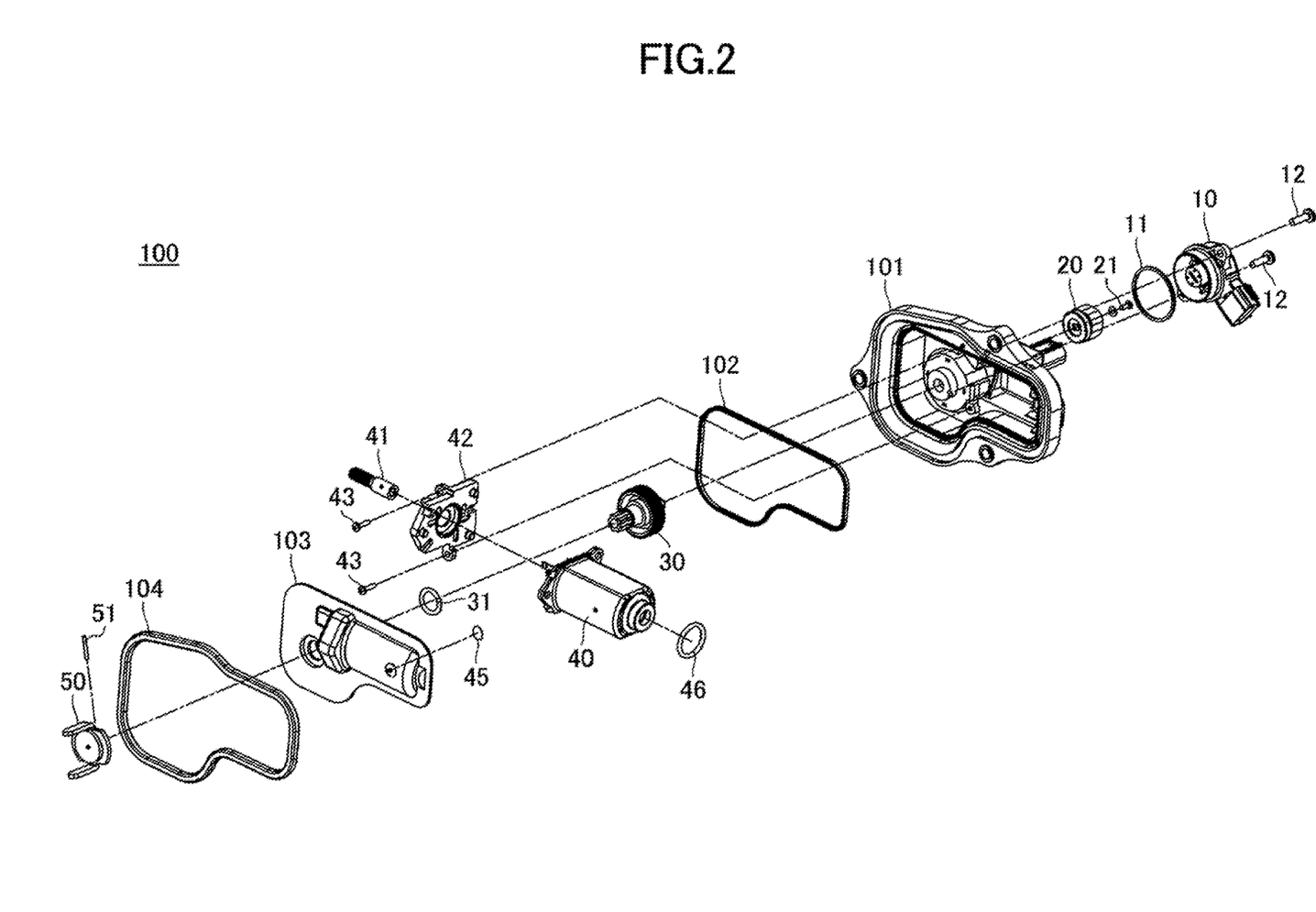
FIG. 2 is an exploded perspective view of the exhaust valve driving device according to the embodiment.
Figure 3:
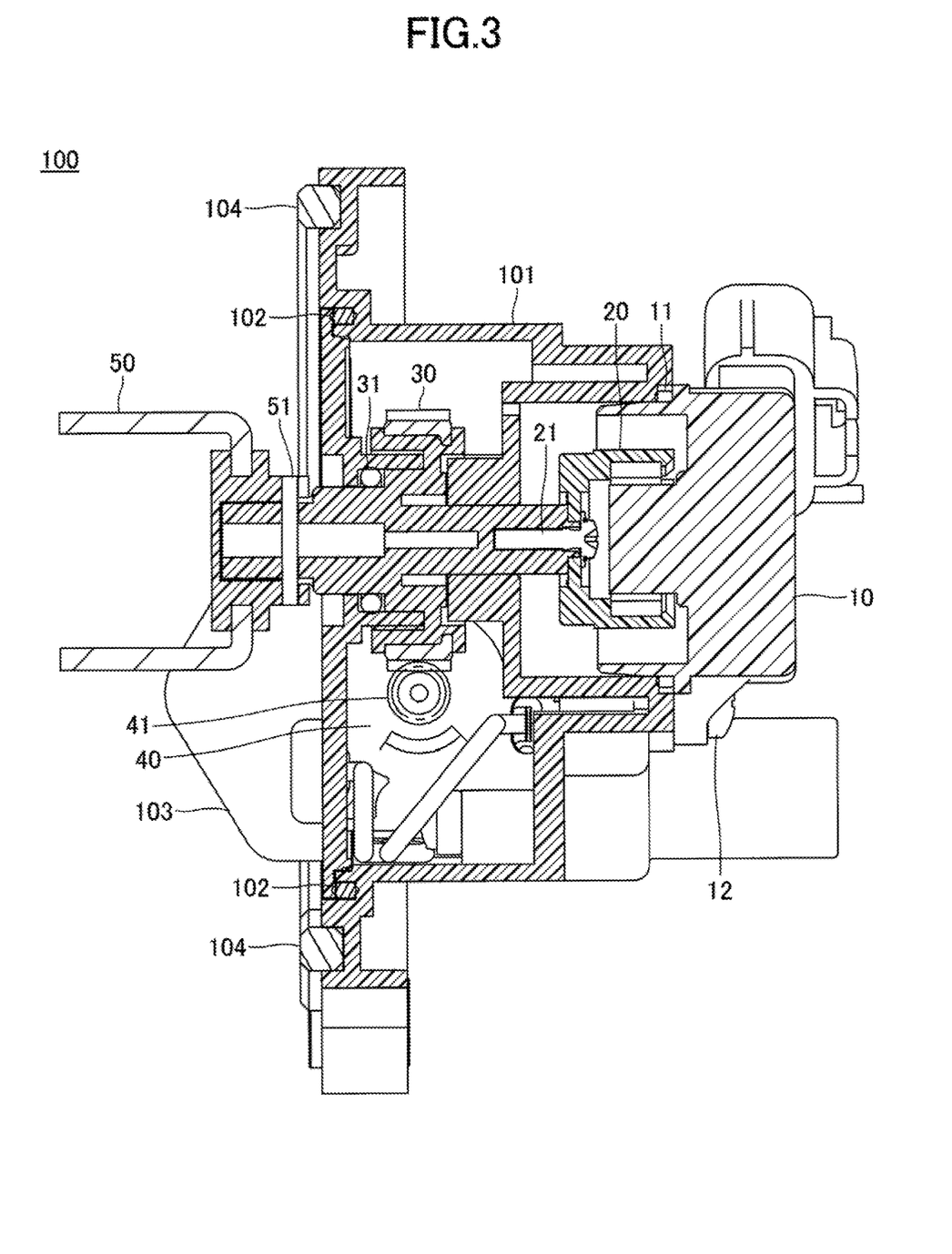
FIG. 3 is a cross-sectional view illustrating a cross section of the exhaust valve driving device of FIG. 1B along a line A-A.
Figure 4:
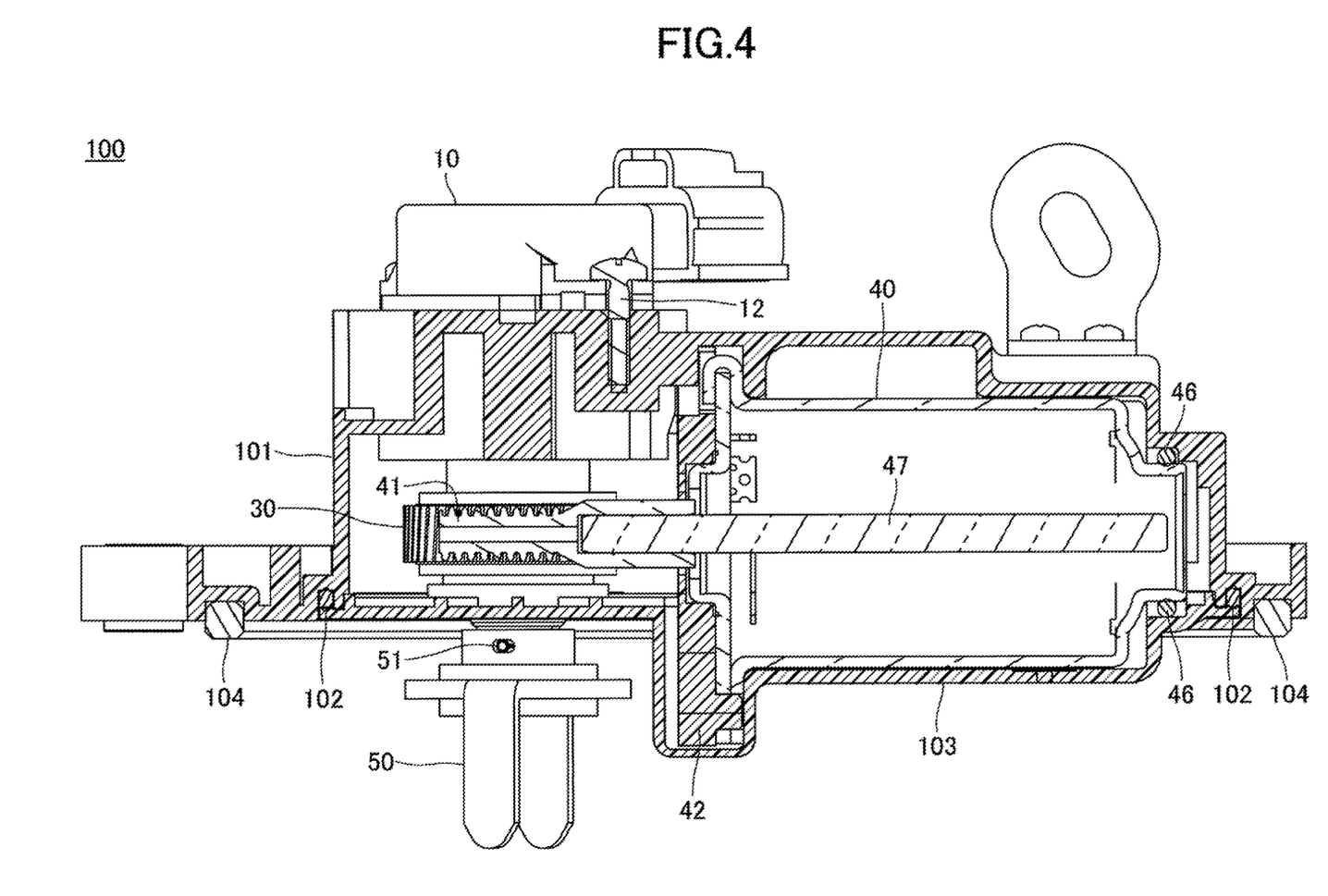
FIG. 4 is a cross-sectional view illustrating a cross section of the exhaust valve driving device of FIG. 1B along a line B-B.

FIGS. 1A and 1B are diagrams illustrating an example of the exhaust valve driving device 100 according to the embodiment. FIG. 1A is a lateral view of the exhaust valve driving device 100; and FIG. 1B is a top view of the exhaust valve driving device 100. FIG. 2 is an exploded perspective view of the exhaust valve driving device 100 according to the embodiment. FIG. 3 is a cross-sectional view illustrating a cross section of the exhaust valve driving device 100 of FIG. 1B along a line A-A, and the cross section passes through a rotational shaft of the shaft integrated gear 30. FIG. 4 is a cross-sectional view illustrating a cross section of the exhaust valve driving device 100 of FIG. 1B along a line B-B, and the cross section passes through a driving shaft of a motor 40.

As illustrated in FIGS. 1 through 4, the exhaust valve driving device 100 includes a position sensor 10; a rotor 20; a shaft-integrated gear 30; a motor 40 as a driving source; a joint 50 as a connection mechanism; an upper casing 101; and a lower casing 103.

The positional sensor 10 is fixed to an upper surface of the upper casing 101 by two screws 12. A gasket 11 for waterproofing is provided between the position sensor 10 and the upper casing 101. The position sensor 10 includes a magnetic sensor, such as a Hall element; and the position sensor 10 detects a rotation position of the shaft-integrated gear 30.

The rotor 20 is fixed to an upper end of a rotational shaft of the shaft-integrated gear 30 by a screw 21. The rotor 20 is formed to have a cylindrical shape; and a permanent magnet and a yoke board are installed on the inner peripheral surface of the rotor 20. The position sensor 10 detects, by the magnetic sensor, a variation in magnetic flux density of the rotor 20 that rotates with the shaft-integrated gear 30, and thereby the position sensor 10 detects a rotation position of the shaft-integrated gear 30.

In the shaft-integrated gear 30, a gear formed of a metal material is integrally formed, by insert molding, together with the rotational shaft formed of a resin material. The shaft-integrated gear 30 is supported by the lower casing 103 through an O-ring 31. The rotor 20 is fixed to an upper end of the shaft-integrated gear 30; and a joint 50 is fixed to a lower end of the shaft-integrated gear 30.

As illustrated in FIG. 3 and FIG. 4, the shaft-integrated gear 30 engages with a worm gear 41 of the motor 40; and the shaft-integrated gear 30 is rotated by the motor 40, as driving force is transmitted from the motor 40. Upon the motor 40 being rotationally driven, the driving force is transmitted from the warm gear 41, and the shaft-integrated gear 30 is driven together with the rotor 20 and the joint 50.

The motor 40 is installed between the upper casing 101 and the lower casing 103; and the motor 40 is supported by a plate-shaped holder 42 and two O-rings 45 and 46. As illustrated in FIG. 2, the holder 42 is fixed to the upper casing 101 by two screws 43.

As illustrated in FIG. 4, in the motor 40, the worm gear 41 that engages with the shaft-integrated gear 30 is provided at an end portion of a drive shaft 47. The motor 40 is controlled by a controller provided outside, so that the motor 40 is rotationally driven; and the motor 40 causes the shaft-integrated gear 30, which engages with the worm gear 41, to be rotated.

The joint 50 is fixed to a lower end portion of the rotational shaft of the shaft-integrated gear 30 by a pin 51; and the joint 50 rotates together with the shaft-integrated gear 30. The joint 50 engages with a valve shaft for rotating a valve element of an exhaust valve. Upon the joint 50 being rotated together with the shaft-integrated gear 30, the valve shaft of the exhaust valve is caused to be rotated, whereby causing an exhaust passage to be opened or closed.

Each of the upper casing 101 and the lower casing 103 is formed of a resin material, for example. The upper casing 101 and the lower casing 103 are joined through a gasket 102 for waterproofing; and the upper casing 101 and the lower casing 103 accommodate therein a gear portion of the shaft-integrated gear 30, a motor 40, and so forth. A wire mesh 104 is attached to a peripheral portion of a lower surface of the upper casing 101.

Next, a configuration of the main part of the shaft-integrated gear 30 according to the embodiment is described in detail by referring to the drawings.

Figure 5A:
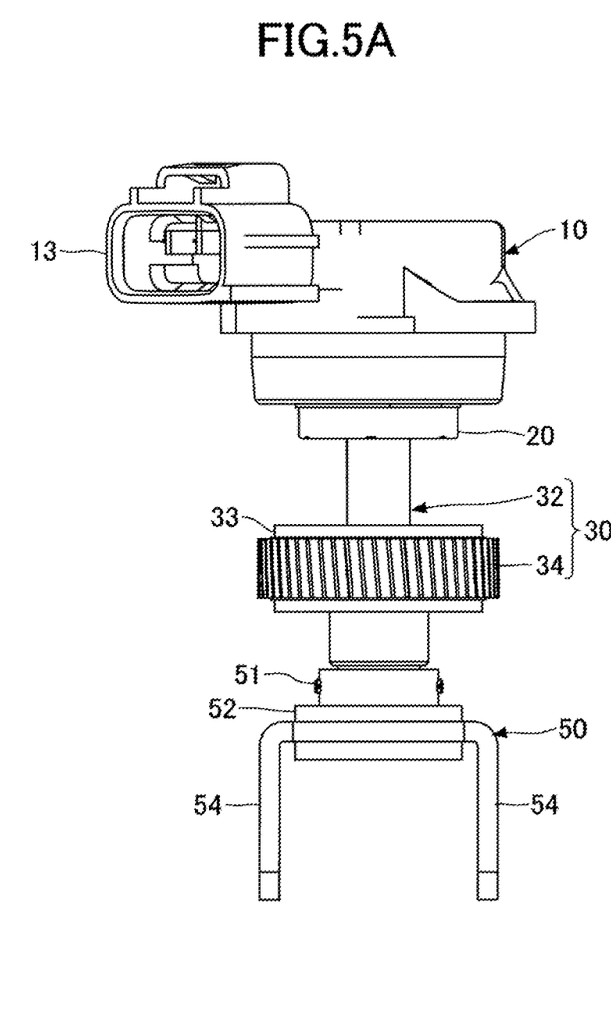
FIGS. 5A and 5B are diagrams illustrating an example of a main part including a shaft-integrated gear according to the embodiment.
Figure 5B:
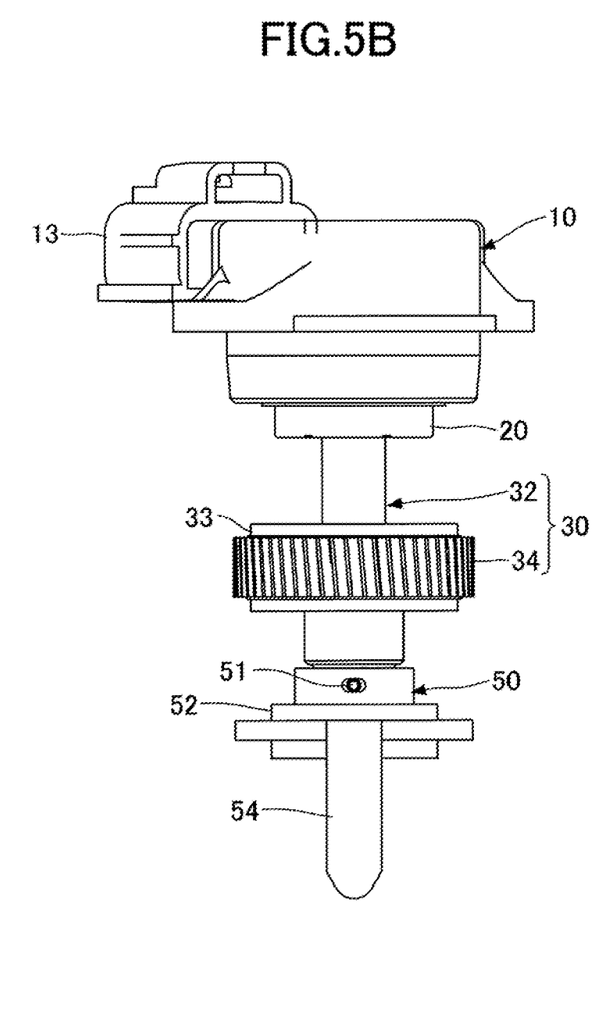
Figure 6:
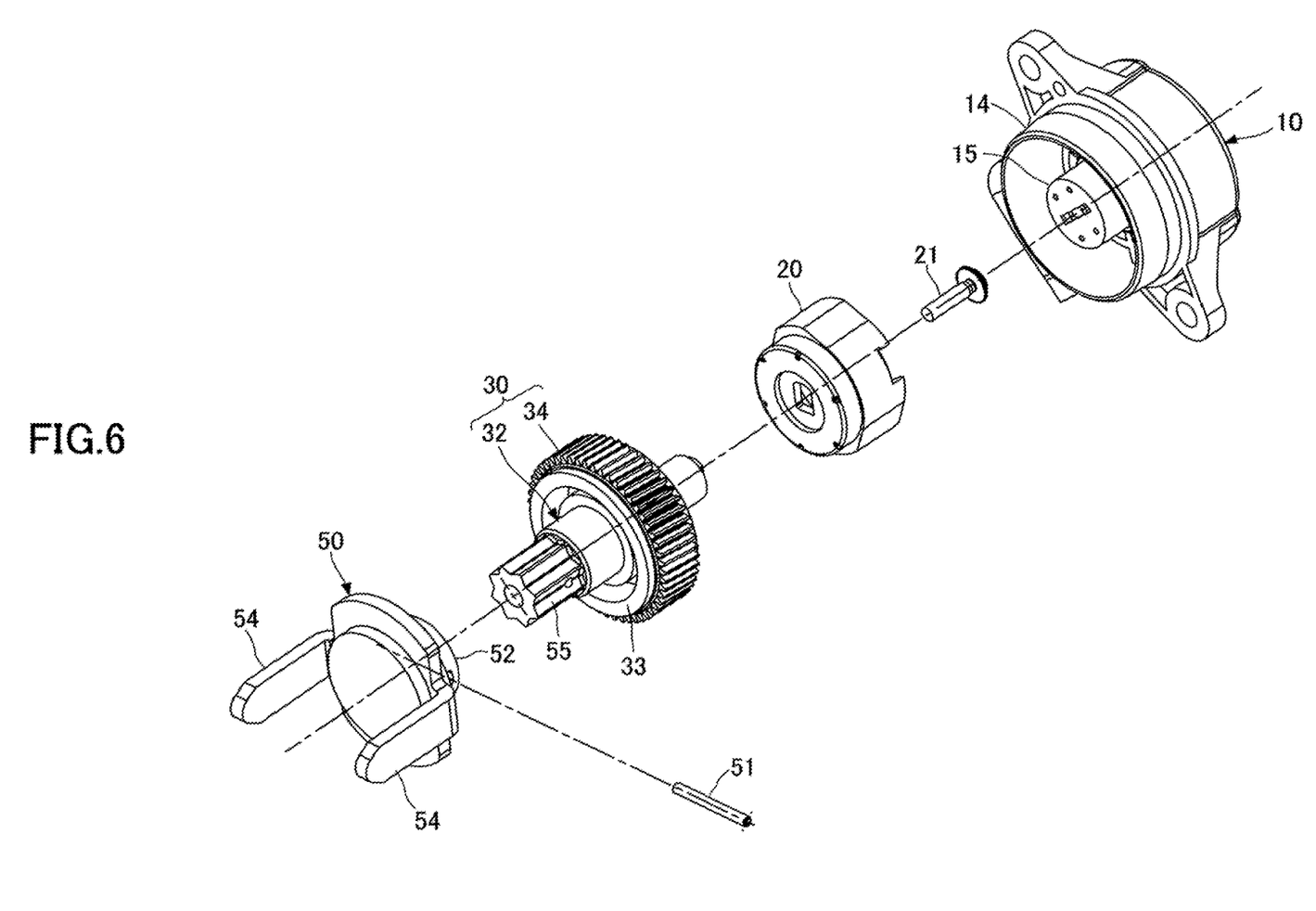
FIG. 6 is an exploded perspective view of the main part including the shaft-integrated gear according to the embodiment.

FIGS. 5A and 5B are diagrams illustrating an example of the main part that includes the shaft-integrated gear 30 according to the embodiment. FIG. 5A and FIG. 5B are lateral diagrams, which are viewed in different angles. FIG. 6 is an exploded perspective view of the main part that includes the shaft-integrated gear 30 according to the embodiment. Furthermore, FIG. 7 is a cross-sectional view of the main part that includes the shaft-integrated gear 30 according to the embodiment.

Figure 7:
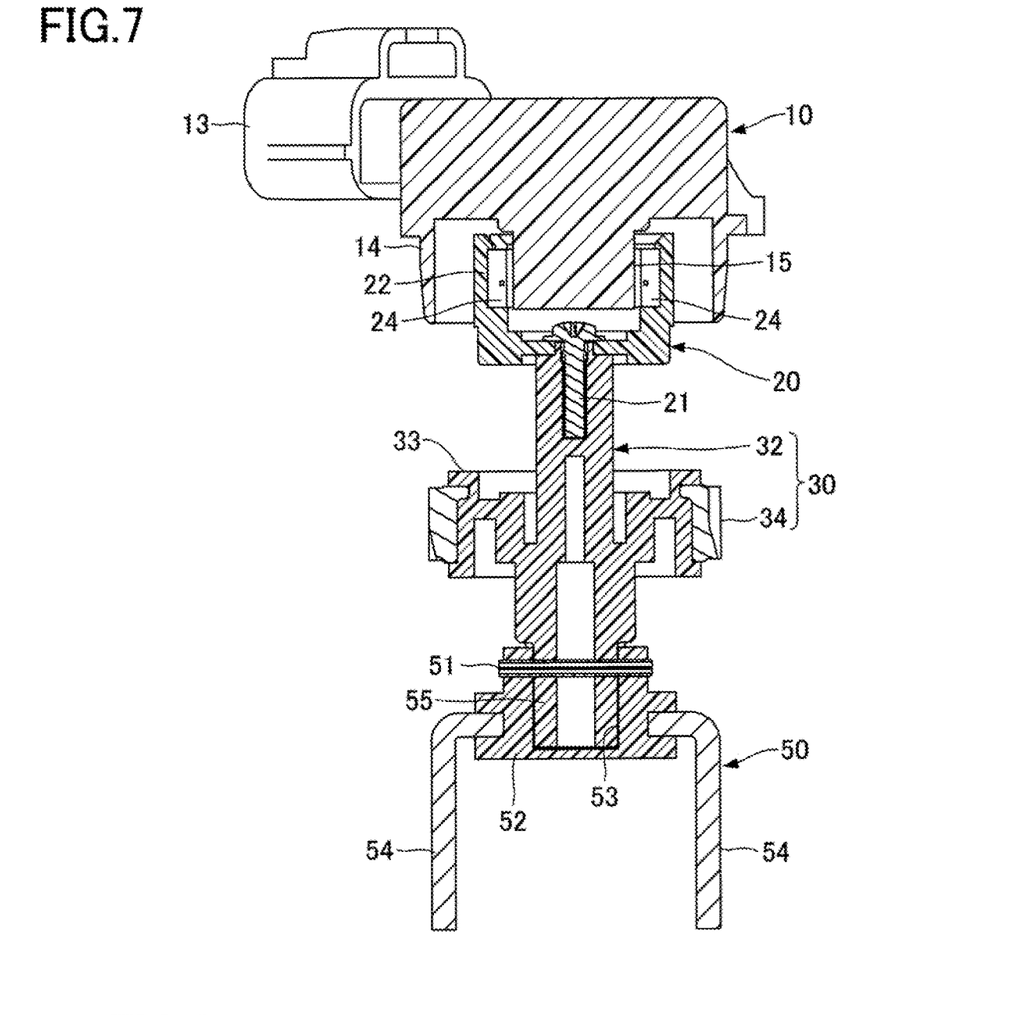
FIG. 7 is a cross-sectional view of the main part including the shaft-integrated gear according to the embodiment.

As illustrated in FIGS. 5 through 7, the position sensor 10 includes a connector 13; an outer cylinder part 14; and a sensor portion 15; and the position sensor 10 is fixed to the upper casing 101 of the exhaust valve driving device 100. A cable for transmitting a detection signal to an external controller is connected to the connector 13. The outer cylinder part 14 is formed to have a cylindrical shape; and the outer cylinder part 14 covers a periphery of the sensor portion 15. The sensor portion 15 is formed to have a columnar shape; and a magnetic sensor is provided inside the sensor portion 15.

The rotor 20 is fixed to the upper end of the shaft-integrated gear 30 by the screw 21; and the rotor 20 rotates together with the shaft-integrated gear 30. The rotor 20 is formed to have a cylindrical shape; and the rotor 20 surrounds the sensor portion 15 of the position sensor 10, which is fixed to the upper casing 101.

Figure 8:
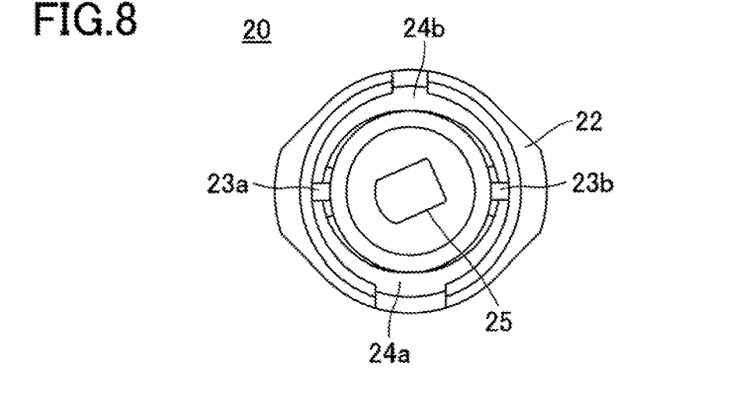
FIG. 8 is a top view of a rotor according to the embodiment.

FIG. 8 is a top view of the rotor 20 according to the embodiment. As illustrated in FIG. 8, the rotor 20 includes, along an inner peripheral surface of a cylindrical part 22, permanent magnets 23a and 23b; and yoke boards 24a and 24b. Each of the permanent magnets 23a and 23b is formed to have a rod-like shape; and the permanent magnets 23a and 23b are arranged to face each other. Each of the yoke boards 24a and 24b is formed to have a half-cylindrical shape; and the yoke boards 24a and 24b are arranged to face each other, while the yoke board 24a is arranged in an interval between the permanent magnets 23a and 23b, and the yoke board 24b is arranged in another interval between the permanent magnets 23a and 23b. The rotor 20 is configured as described above; and a magnetic field is formed between the yoke board 24a and the yoke board 24b.

As described in FIGS. 5 through 7, the joint 50 includes a connecting portion 52; and two engaging claws 54. The connecting portion 52 is formed of a resin material; and the connecting portion 52 includes a connecting hole 53 into which a connecting shaft 55 of the shaft-integrated gear 30 is to be inserted. The connecting portion 52 is fixed, by a pin 51, to the connecting shaft 55 of the shaft-integrated gear 30, which is to be inserted into the connecting hole 53.

The engaging claws 54 are formed of a metal material; and the engaging claws 54 are formed to be extended from the connecting portion 52 toward a side opposite to the shaft-integrated gear 30 in a direction that is parallel to the direction of the rotational shaft of the shaft-integrated gear 30. The engaging claws 54 engages the valve shaft of the exhaust valve installed in the exhaust passage.

Upon the motor 40 of the exhaust valve driving device 100 being rotationally driven, the shaft-integrated gear 30 rotates together with the rotor 20 and the joint 50. As the joint 50 rotates together with the shaft-integrated gear 30, the valve shaft of the exhaust valve, to which the engaging claws are engaged, rotates; and the valve element connected to the valve shaft rotates, so as to open or close the exhaust passage.

When the rotor 20 rotates together with the shaft-integrated gear 30, a direction of the magnetic field around the sensor portion 15 of the position sensor 10 that is fixed varies in accordance with the rotation of the rotor 20. The magnetic sensor in the sensor portion 15 outputs a signal corresponding to magnetic flux density that is varied by the rotation of the rotor 20 together with the direction of the magnetic field.

The controller connected to the position sensor 10 detects a rotation position of the shaft-integrated gear 30, based on a signal output from the magnetic sensor. Further, the controller can recognize an opened or closed state of the exhaust valve that is connected to the shaft-integrated gear 30 through the joint 50 by detecting the rotation position of the shaft-integrated gear 30.

As illustrated in FIGS. 5 through 7, the shaft-integrated gear 30 includes a rotational shaft 32; and a gear 34. The rotational shaft 32 is formed of a resin material. Further, the gear 34 is formed of a metal material. The gear 34 is, for example, a sintered gear formed of a metal material. The rotational shaft 32 and the gear 34 are integrally formed by insert molding.

The rotational shaft 32 includes a gear support part 33; and a connecting shaft 55. The gear support part 33 is formed to have a cylindrical shape; and the gear 34 fits around the gear support part 33. The connecting shaft 55 is formed to have a polygonal prism shape; and the connecting shaft 55 is formed at a lower end portion of the rotational shaft 32. The connecting shaft 55 is inserted into the connecting hole 53, which is formed at the connecting portion 52 of the joint 50; and the joint 50 is fixed to the connecting shaft 55 by the pin 51.

The gear 34 is formed to have a cylindrical shape; and the gear 34 fits around the gear support part 33 of the rotational shaft 32. Teeth 35 of the gear 34 that engage the warm gear 41 of the motor 40 are formed on an outer peripheral surface of the gear 34; and driving force of the motor 40 is transmitted to the gear 34 through the warm gear 41.

Upon the motor 40 being rotationally driven, driving force is transmitted from the motor 40 to the gear 34, and the rotational shaft 32 that is integrally formed in the gear 34 rotates together with the rotor 20 and the joint 50. In this manner, when the motor 40 is rotationally driven, and the joint 50 rotates together with the rotational shaft 32, the exhaust valve that is connected to the joint 50 is opened or closed. Furthermore, when the rotor 20 rotates together with the rotational shaft 32, a rotation position of the rotational shaft 32 and the opened or closed state of the exhaust valve are detected based on an output from the magnetic sensor of the position sensor 10.

Next, a configuration of the gear 34 of the shaft-integrated gear 30 and a structure for supporting the gear 34 by the gear support part 33 of the rotational shaft 32 are described by referring to the drawings.

Figure 9:
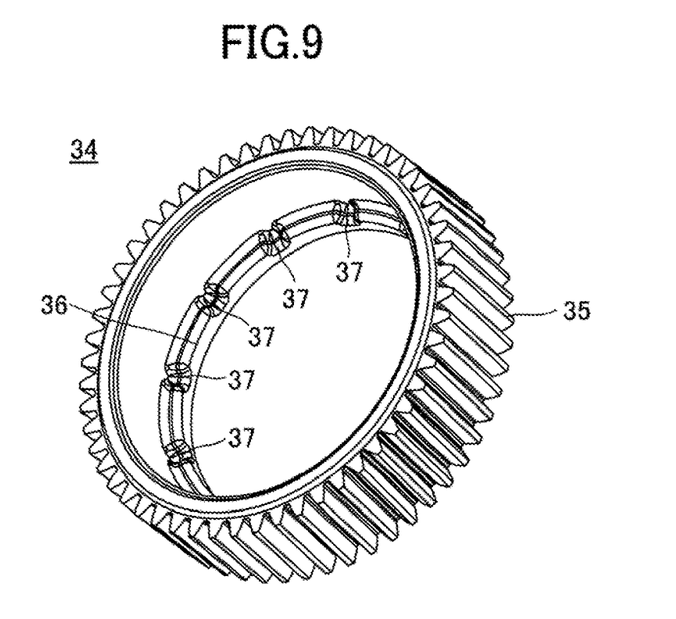
FIG. 9 is a perspective view of a gear according to the embodiment.
Figure 10:
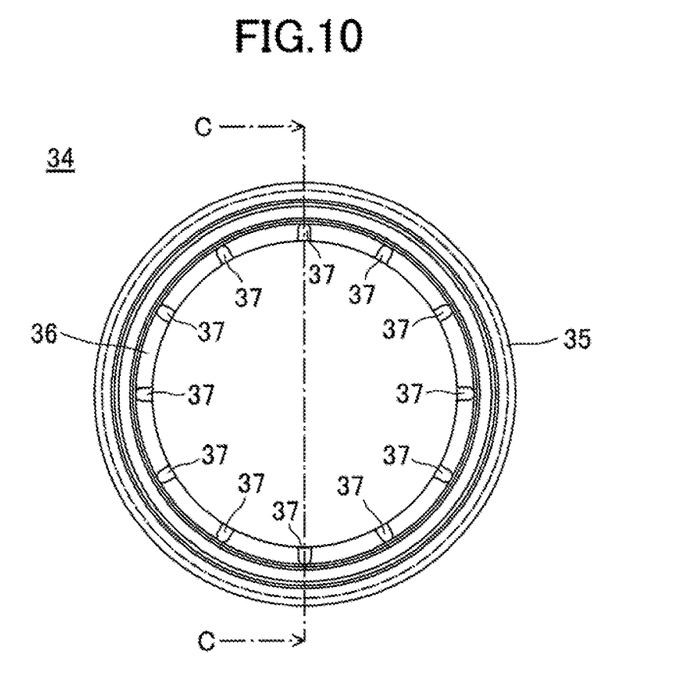
FIG. 10 is a top view of the gear according to the embodiment.
Figure 11:
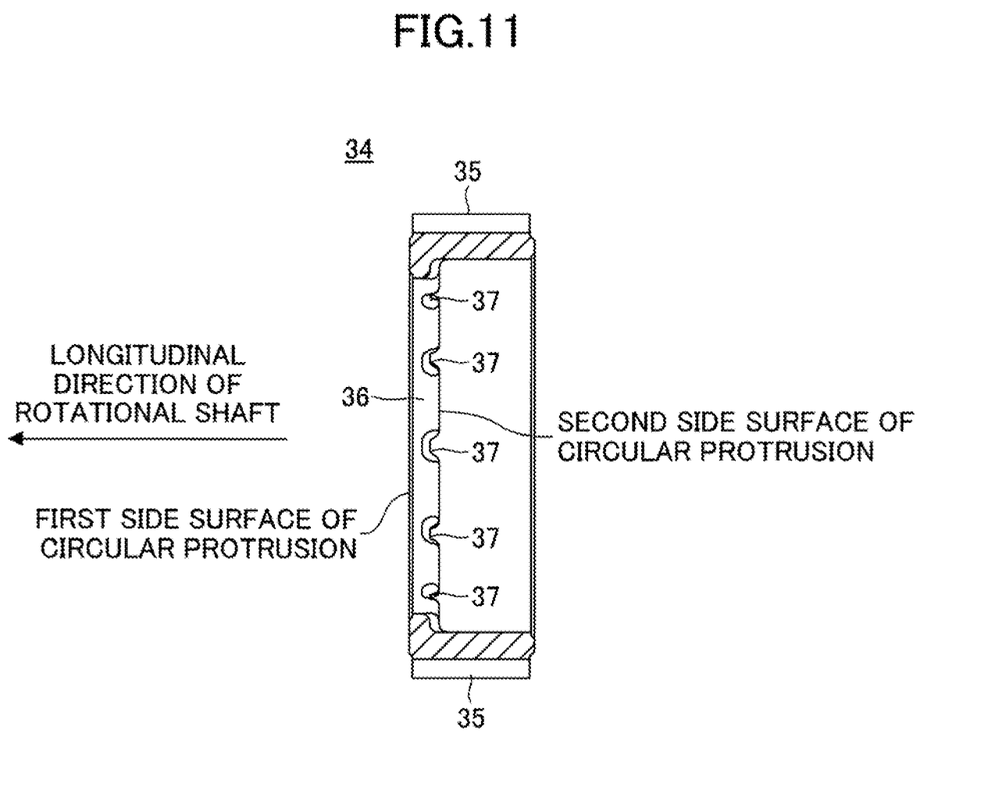
FIG. 11 is a cross-sectional view illustrating a cross section of the gear of FIG. 10 along a C-C line.

FIG. 9 is a perspective view of the gear 34 according to the embodiment. Further, FIG. 10 is a top view of the gear 34 according to the embodiment. FIG. 11 is a cross-sectional view illustrating a cross section of the gear of FIG. 10 along a C-C line.

As illustrated from FIGS. 9 through 11, the gear 34 is formed to have a cylindrical shape; and the teeth 35 that engage the warm gear 41 of the motor 40 are formed on an outer peripheral surface of the gear 34. Additionally, the gear 34 includes a circular protrusion 36 that protrudes toward an inner side in a radial direction from an inner peripheral surface of the gear 34. The circular protrusion 36 is formed on the entire circumference of the inner peripheral surface of the gear 34; and a plurality of fixing grooves 37 is formed at equal intervals.

The gear 34 is integrally formed with the rotational shaft 32 by insert molding, so that the gear 34 fits around the gear support part 33. In the insert molding of the rotational shaft 32 and the gear 34, a resin that forms the gear support part 33 is poured into the side of the inner peripheral surface of the gear 34; and the gear 34 and the gear support part 33 are integrally formed, so that the circular protrusion 36 bites the outer peripheral surface of the gear support part 33.

In this manner, by forming the circular protrusion 36 including the plurality of fixing grooves 37 in such a manner that the circular protrusion 36 bites the outer peripheral surface of the gear support part 33, the gear 34 and the gear support part 33 engage with each other; and the gear 34 can rotate together with the rotational shaft 32, without slipping.

Figure 12A:
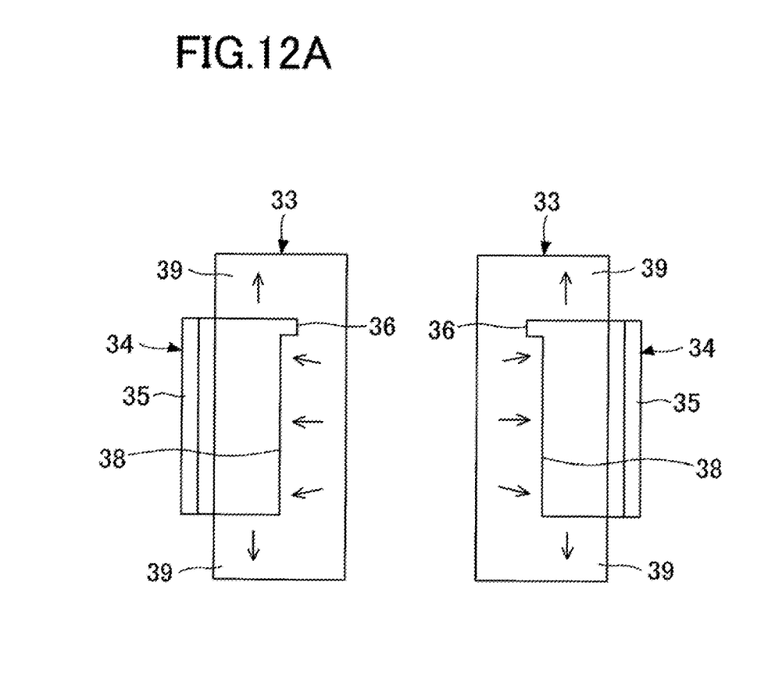
FIGS. 12A and 12B are diagrams illustrating a structure for supporting the gear by a gear support part according to the embodiment.
Figure 12B:
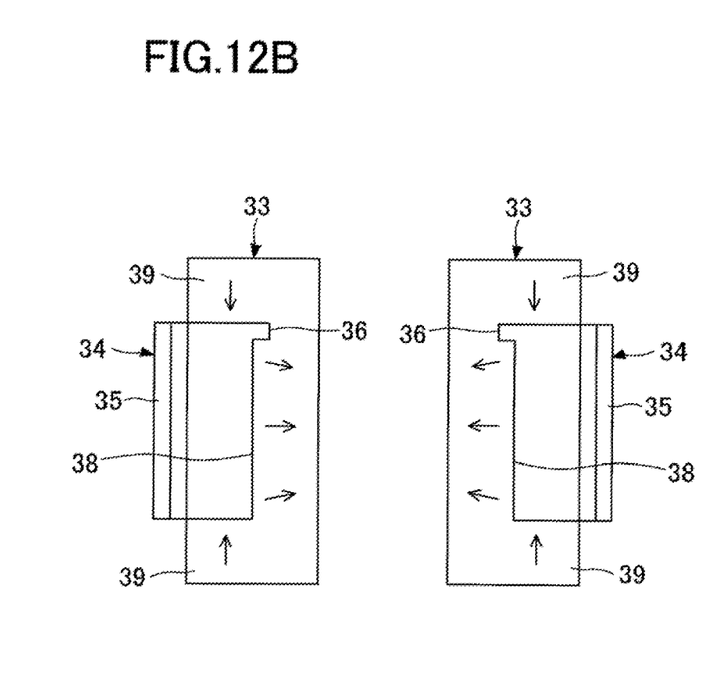

FIGS. 12A and 12B are diagrams illustrating the structure for supporting the gear 34 by the gear support part 33 according to the embodiment.

As illustrated in FIGS. 12A and 12B, the gear 34 fits around a circular groove 38 that is formed on the entire circumference of the gear support part 33; and the gear 34 is integrally formed with the gear support part 33, so that the gear 34 is clamped between lateral walls 39 of the circular groove 38.

For example, as illustrated in FIG. 12A, with such a configuration, when the temperature increases, the gear support part 33 that is formed of the resin material is expanded; and the expanded gear support part 33 presses the inner peripheral surface of the gear 34. In this manner, when the temperature increases, the gear 34 is fixed to and supported by the gear support part 33, as the inner peripheral surface of the gear 34 is pressed toward outside in the radial direction.

Additionally, as illustrated in FIG. 12B, for example, when the temperature decreases, the gear support part 33 that is formed of a resin material shrinks; and the lateral walls 39 press side surfaces of the gear 34. In this manner, when the temperature decreases, the gear 34 is fixed to and supported by the gear support part 33, so as to be clamped between the lateral walls 39.

As described above, for a case where the gear support part 33 that is formed of the resin material is expanded due to the temperature change, and for a case where the gear support part 33 that is formed of the resin material is shrunk due to the temperature change, the gear 34 is firmly fixed to and supported by the gear support part 33. The gear 34 is fixed to and supported by the gear support part 33 regardless of the temperature change, and the gear 34 and the gear support part 33 engage with each other by the circular protrusion 36 formed on the inner peripheral surface of the gear 34, so that the gear 34 can rotate together with the rotational shaft 32, without slipping.

As described above, in the shaft-integrated gear 30 according to the embodiment, the rotational shaft 32 is formed of the resin material with the thermal conductivity that is lower than thermal conductivity of a metal. Consequently, the heat insulating property of the rotational shaft 32 is enhanced, and a quantity of heat is reduced that is transmitted, to the position sensor 10 and the motor 40, from the exhaust valve installed in the exhaust passage, into which a high temperature exhaust gas is flowed. Thus, it is not necessary to arrange the position sensor 10, the motor 40, and so forth to be separated from the exhaust valve and the shaft-integrated gear 30, so that the exhaust valve driving device 100 can be downsized, and the configuration of the exhaust valve driving device 100 can be simplified.

Additionally, in the shaft-integrated gear 30, the gear 34 is formed of a metal material. Thus, even in a high temperature environment, the strength of the gear 34 is maintained, and the gear 34 is prevented from being damaged due to an impact during opening and closing of the exhaust valve, for example. Furthermore, the gear 34 is integrally formed with the rotational shaft 32 by insert molding, so that the circular protrusion 36 bites the outer peripheral surface of the gear support part 33, and that the gear 34 fits the circular groove 38 of the gear support part 33. With such a configuration, the gear 34 is fixed to and supported by the gear support part 33, regardless of the temperature change; and the gear 34 rotates together with the rotational shaft 32, without slipping.

As described above, with the shaft-integrated gear 30 according to the embodiment, driving force can be transmitted from the motor 40, as a driving source, to the exhaust valve, as a target to be driven, with a small and simple configuration; and a heat insulating property between the exhaust valve and the motor is enhanced. Furthermore, with the exhaust valve driving device 100 that includes the shaft-integrated gear 30, the size can be reduced, and the configuration can be simplified.

The shaft-integrated gear and the exhaust valve driving device are described above by the embodiment. However, the present invention is not limited to the embodiment, and various modifications and improvements may be made within the scope of the present invention.

For example, in the above-described embodiment, a configuration is exemplified where the magnetic sensor, such as the Hall element, is used as the position sensor 10. However, a rotation position of the shaft-integrated gear 30 may be detected by a different method. Further, the configurations, such as the shape of the circular protrusion 36 that is formed on the inner peripheral surface of the gear 34, and the number and the position of the fixing grooves 37, are not limited to the configurations exemplified in the above-described embodiment, as long as slipping of the gear 34 can be prevented. Further, the configuration of the engaging claws 54 of the joint 50 is not limited to the configuration that is exemplified in the embodiment, and the configuration of the engaging claws 54 may be designed depending on the configuration of the exhaust valve, to which the engaging claws 54 are connected. Furthermore, in the embodiment, the exhaust valve driving device 100 that includes the shaft-integrated gear 30 is exemplified; however, the shaft-integrated gear 30 can be used for various devices.

The present application is based on and claims the benefit of priority of Japanese Priority Application No. 2015-249563, filed on Dec. 22, 2015, the entire contents of which are hereby incorporated herein by reference.

The invention claimed is:

1. A shaft-integrated gear comprising:
a rotational shaft formed of a resin material;
a cylindrical gear formed of a metal material, the cylindrical gear externally fit around a circular groove of the rotational shaft;
a single circular protrusion that protrudes toward an inner side in a radial direction from an inner peripheral surface of the cylindrical gear; and
fixing grooves that extend from a second side surface of the circular protrusion in a longitudinal direction of the rotational shaft, wherein the second side surface is orthogonal to the longitudinal direction of the rotational shaft,
wherein the circular protrusion is formed at one end of the inner peripheral surface, and the circular protrusion is provided with a first side surface formed at the one end of the inner peripheral surface and the second side surface that is parallel to the first side surface, wherein the second side surface is formed at an inner side of the inner peripheral surface compared to the first side surface in the longitudinal direction of the rotational shaft,
wherein the fixing grooves extend from the second side surface in the longitudinal direction of the rotational shaft toward the first side surface, and a length of each of the fixing grooves in the longitudinal direction of the rotational shaft is less than a distance in the longitudinal direction of the rotational shaft from the second side surface to the first side surface, and
wherein the first side surface of the circular protrusion is flush with an end face of the cylindrical gear in the longitudinal direction of the rotational shaft on an entire circumference of the cylindrical gear in a circumferential direction of the cylindrical gear.

2. The shaft-integrated gear according to claim 1, wherein the cylindrical gear is integrally formed with the rotational shaft by insert molding.

3. A driving device comprising:
a shaft-integrated gear including a rotational shaft formed of a resin material, a cylindrical gear formed of a metal material, the cylindrical gear externally fit around a circular groove of the rotational shaft, a single circular protrusion that protrudes toward an inner side in a radial direction from an inner peripheral surface of the cylindrical gear; and fixing grooves that extend from a second side surface of the circular protrusion in a longitudinal direction of the rotational shaft, wherein the second side surface is orthogonal to the longitudinal direction of the rotational shaft, wherein the circular protrusion is formed at one end of the inner peripheral surface, and the circular protrusion is provided with a first side surface formed at the one end of the inner peripheral surface and the second side surface that is parallel to the first side surface, wherein the second side surface is formed at an inner side of the inner peripheral surface compared to the first side surface in the longitudinal direction of the rotational shaft wherein the fixing grooves extend from the second side surface in the longitudinal direction of the rotational shaft toward the first side surface, and a length of each of the fixing grooves in the longitudinal direction of the rotational shaft is less than a distance in the longitudinal direction of the rotational shaft from the second side surface to the first side surface, and wherein the first side surface of the circular protrusion is flush with an end face of the cylindrical gear in the longitudinal direction of the rotational shaft on an entire circumference of the cylindrical gear in a circumferential direction of the cylindrical gear,
a motor configured to be connected to the cylindrical gear to drive the shaft-integrated gear;
a position sensor that detects a rotation position of the shaft-integrated gear; and
a joint provided with a connecting hole into which a connecting shaft of the shaft-integrated gear is to be inserted.

4. The driving device according to claim 3, wherein the cylindrical gear is integrally formed with the rotational shaft by insert molding.

\* \* \* \* \*